United States Patent
Thomas et al.

(10) Patent No.: US 6,997,633 B2
(45) Date of Patent: Feb. 14, 2006

(54) COUPLING FOR SPLIT-BOOM POWER TOOL

(75) Inventors: Benjamin J. Thomas, Anderson, SC (US); Ernest W. Spangler, III, Raleigh, NC (US); Kenneth M. Brazell, Piedmont, SC (US); Taku Ohi, Greer, SC (US); Elton L. Watson, Greenville, SC (US); Ronald C. McCurry, West Union, SC (US)

(73) Assignee: Homelite Technologies, Ltd., Hamilton (BM)

( * ) Notice: Subject to any disclaimer, the term of this patent is extended or adjusted under 35 U.S.C. 154(b) by 40 days.

(21) Appl. No.: 10/261,567

(22) Filed: Sep. 30, 2002

(65) Prior Publication Data

US 2004/0060274 A1    Apr. 1, 2004

(51) Int. Cl.
*F16B 7/10* (2006.01)

(52) U.S. Cl. .............. 403/109.6; 403/109.2; 403/109.8; 403/378; 403/379.5; 30/122; 172/438

(58) Field of Classification Search ........... 30/276, 30/122; 172/13, 41, 438; 56/12.7; 403/11, 403/13, 14, 109.1, 109.2, 109.5–109.8, 335, 403/377, 378, 379.5; 285/314, 315, 7
See application file for complete search history.

(56) References Cited

U.S. PATENT DOCUMENTS

| | | | |
|---|---|---|---|
| 1,189,802 A * | 7/1916 | Eckert | 285/314 |
| 2,162,359 A | 6/1939 | Rhinevault | 287/119 |
| 2,672,924 A | 3/1954 | Anthes | 158/27.4 |
| 4,272,087 A | 6/1981 | Rohm | 279/62 |
| 4,463,498 A | 8/1984 | Everts | 30/296 R |
| 4,505,040 A * | 3/1985 | Everts | 30/296.1 |
| 4,859,110 A | 8/1989 | Dommel | 403/325 |
| 4,927,286 A | 5/1990 | Hobluigie et al. | 403/322 |
| 4,960,344 A | 10/1990 | Geisthoff et al. | 403/316 |
| 5,601,380 A | 2/1997 | Guthrie et al. | 403/359 |
| 5,802,724 A * | 9/1998 | Rickard et al. | 30/296.1 |
| 6,006,434 A * | 12/1999 | Templeton et al. | 30/296.1 |
| 6,085,998 A | 7/2000 | Yokoyama | 239/600 |
| 6,139,214 A | 10/2000 | Zirps et al. | 403/325 |
| 6,151,810 A | 11/2000 | Mukai | 37/350 |
| 6,474,747 B1 * | 11/2002 | Beaulieu et al. | 30/296.1 |

* cited by examiner

*Primary Examiner*—Daniel P. Stodola
*Assistant Examiner*—Michael P. Ferguson
(74) *Attorney, Agent, or Firm*—Brinks Hofer Gilson & Lione

(57) ABSTRACT

A power tool coupling system for coupling two boom members of a split-boom power tool. The coupling system includes a first section and a second section. The first section is adapted to be fixedly attached to an end of a first one of the boom members. The first section includes an aperture for receiving a locating member on a second one of the boom members. The second section is movably connected to the first section. The second section is adapted to depress the locating member, while the locating member is located in the aperture of the first section, when the second section is moved from a first to a second position.

14 Claims, 6 Drawing Sheets

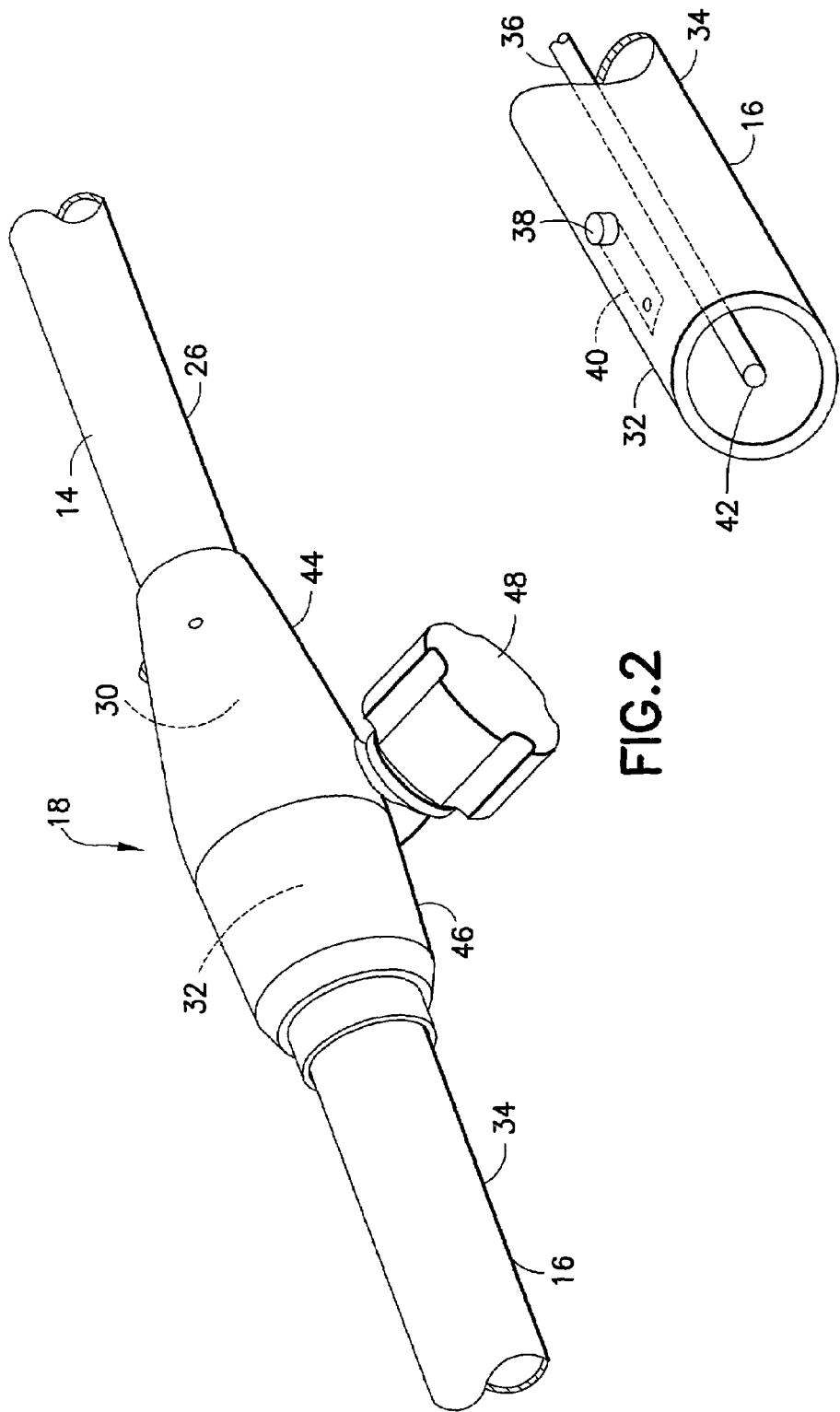

COUPLING FOR SPLIT-BOOM POWER TOOL

BACKGROUND OF THE INVENTION

1. Field of the Invention

The present invention relates to power tools and, more particularly, to a coupling for a split-boom power tool.

2. Brief Description of Prior Developments

U.S. Pat. No. 5,802,724 discloses a coupling for a split-boom power tool. One embodiment has a rotatable knob for clamping flanges of a coupling together to clamp two boom members within the coupling. One of the boom members has a spring loaded locating pin that projects into an aperture of the coupling.

A problem exists with prior art power tool split-boom couplings in that disconnection of the two booms from each other can be cumbersome and time consuming. There is a desire to provide a power tool split-boom coupling system which is easier to operate than prior art systems and less time consuming to detach and attach interchangeable optional components at the split-boom coupling system.

SUMMARY OF THE INVENTION

In accordance with one aspect of the present invention, a power tool coupling system is provided for coupling two boom members of a split-boom power tool. The coupling system includes a first section and a second section. The first section is adapted to be fixedly attached to an end of a first one of the boom members. The first section includes an aperture for receiving a locating member on a second one of the boom members. The second section is movably connected to the first section. The second section is adapted to depress the locating member, while the locating member is located in the aperture of the first section, when the second section is moved from a first to a second position.

In accordance with another aspect of the present invention, a power tool attachment system is provided for attaching a first boom member and a second boom member in a split-boom power tool. The attachment system comprising a first section adapted to be attached to the first boom member; and a second section rotatably connected to the first section. The second section is rotatable about an axis extending through the first section and is adapted to receive an end of the second boom member therealong. The second section is adapted to engage a portion of the second boom member when the second section is moved to a predetermined position relative to the first section for assisting in attaching or releasing connection of the second boom member with the first boom member.

In accordance with one method of the present invention, a method of disconnected two power tool boom members is provided comprising steps of rotating a collar on a coupler from a first position to a second position; and depressing a locating member on a second one of the boom members by the collar as the collar is rotated from the first position to the second position, wherein the locating member is moved, at least partially, out of engagement with an aperture in the coupler by the collar.

BRIEF DESCRIPTION OF THE DRAWINGS

The foregoing aspects and other features of the present invention are explained in the following description, taken in connection with the accompanying drawings, wherein:

FIG. 2 is an enlarged perspective view of a split-boom coupling system of the tool shown in FIG. 1;

FIG. 3 is a perspective view of an end of the lower boom member shown in FIGS. 1 and 2;

DETAILED DESCRIPTION OF THE PREFERRED EMBODIMENT

Figure 1:
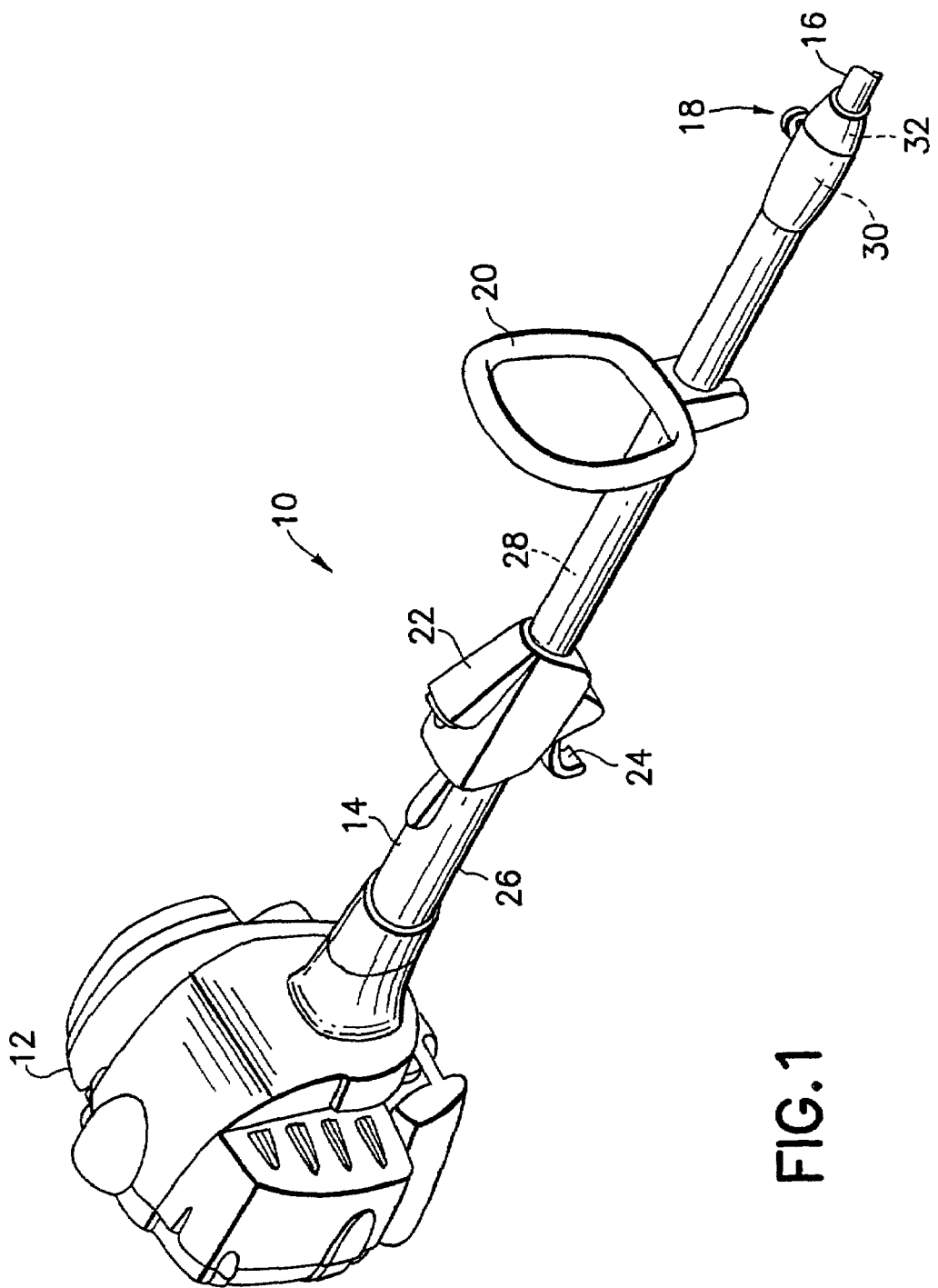
FIG. 1 is a perspective view of a portion of a power tool incorporation features of the present invention.

Referring to FIG. 1, there is shown a perspective view of a portion of a power tool 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

The power tool 10 in this embodiment is a string trimmer. However, the power tool is a modular reconfigurable tool of a split-boom type adapted to have any one of a number of lower end boom members attached thereto for performing different functions such as a blower, a hedge trimmer, a pruner, etc., similar to those described in U.S. Pat. No. 5,802,724 which is hereby incorporated by reference in its entirety. However, features of the present invention could be used with any suitable type of power tool split-boom attachment.

The power tool 10 generally comprises a motor 12, a first boom member 14, a second boom member 16 and a coupling system 18. However, in alternate embodiment, features of the present invention could include additional or alternative components then those described below. The motor 12, in the embodiment shown, comprises an internal combustion engine. However, in alternate embodiments, the motor 12 could comprise an electric motor, such as a battery operated motor.

The first boom member 14 extends from the front end of the motor 12. The tool includes a front handle 20 and a user control 22 attached to the front boom member 14. However, in alternate embodiments, any suitable type of handle system could be provided. The user control 22 includes a throttle trigger 24. However, in alternate embodiments, any suitable type of user control could be provided. The first boom member 14 generally comprises a straight tubular frame 26 and a first rotatable drive shaft 28 extending through the frame 26. In an alternate embodiment, the frame 26 could have a non-straight shape. The first rotatable drive shaft 28 is connected to an output from the motor 12 and extends to a front end 30 of the first boom member 14.

Referring also to FIGS. 2 and 3, the coupling system 18 is used to connect a rear end 32 of the second boom member 16 to the front end 30 of the first boom member 14. The second boom member 16 includes a tubular frame 34, a second rotatable drive shaft 36, and a working end (not shown), such as a string trimmer head, located at a distal, front end of the tubular frame 34.

In the embodiment shown, a the rear end 32 of the second boom member 16 also comprises a spring loaded locating member 38. A leaf spring 40 connects the locating member 38 to the tubular frame 34. The leaf spring 40 is located inside the tubular frame 34. The locating member 38 extends through a hole in the tubular frame 34. The locating member 38 can be depressed into the tubular frame 34. The spring 40 can bias the locating member 38 in an outward direction. The locating member 38 and spring 40 form part of a locating system for initially locating the second boom member 16 relative to the first boom member 14 at one of three possible angular orientations; approximately 90 degrees apart. In a preferred embodiment, the outer end of the locating member 38 has a curved shape. However, in alternate embodiments, any suitable type of locating system for initially locating the second boom member 16 relative to the first boom member 14 could be provided. The initial locating system might be adapted to initially locate the second boom member 16 relative to the first boom member 14 at more or less than three possible angular orientations and/or at more or less than 90 degree offsets.

Figure 6:
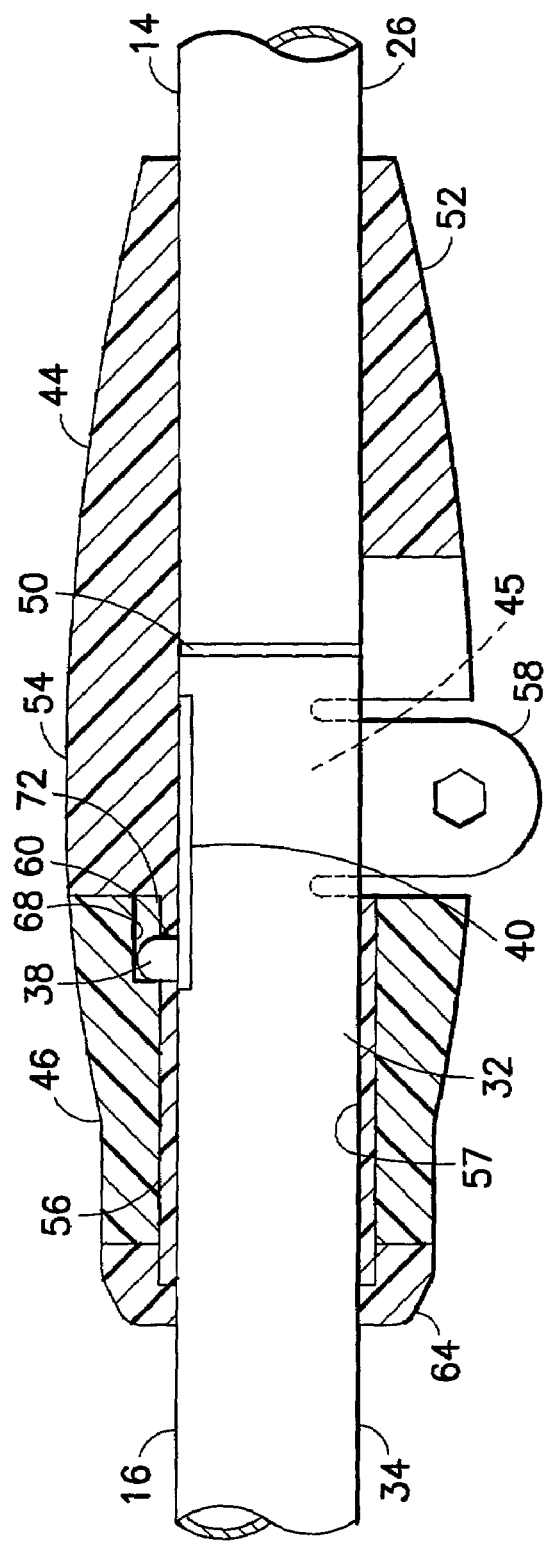
FIG. 6 is a cross-sectional view of the split-boom coupling system of the tool shown in FIG. 2.

A rear end 42 of the second rotatable drive shaft 36 is adapted to removably mate with a front end of the first rotatable drive shaft 28 as is known in the art, such as by use of a connector 50 (see FIG. 6). Thus, rotation of the first rotatable drive shaft 28 causes the second rotatable drive shaft 36 to rotate. In an alternate embodiment, the power tool 10 could comprise electrical conductors extending through the tubular frames 26, 34 rather than the drive shafts 28, 36. The connector 50 could comprise an electrical connector to removably connect the electrical conductors to each other.

Figure 4:
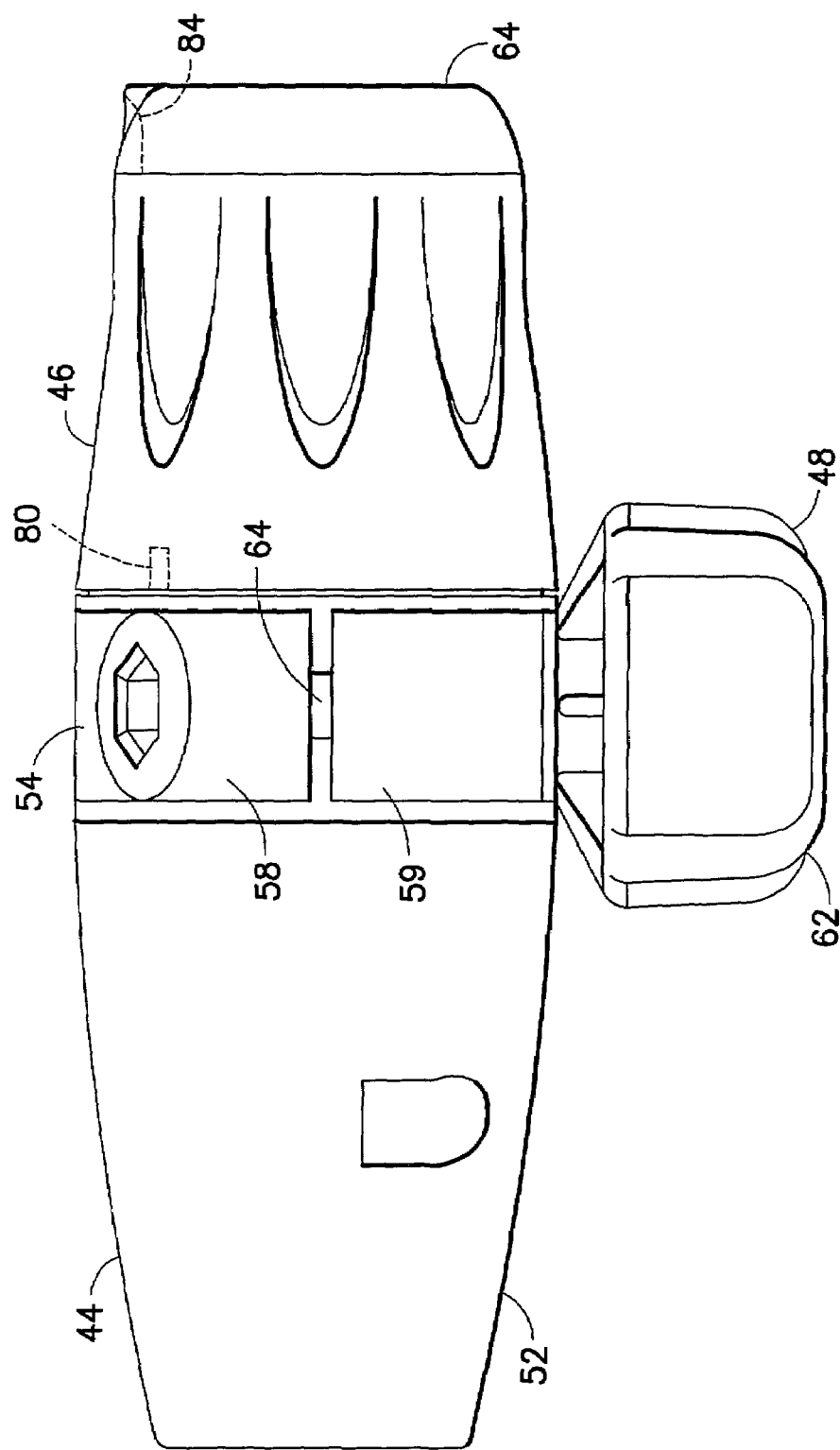
FIG. 4 is a bottom plan view of the split-boom coupling system shown in FIG. 2.
Figure 5:
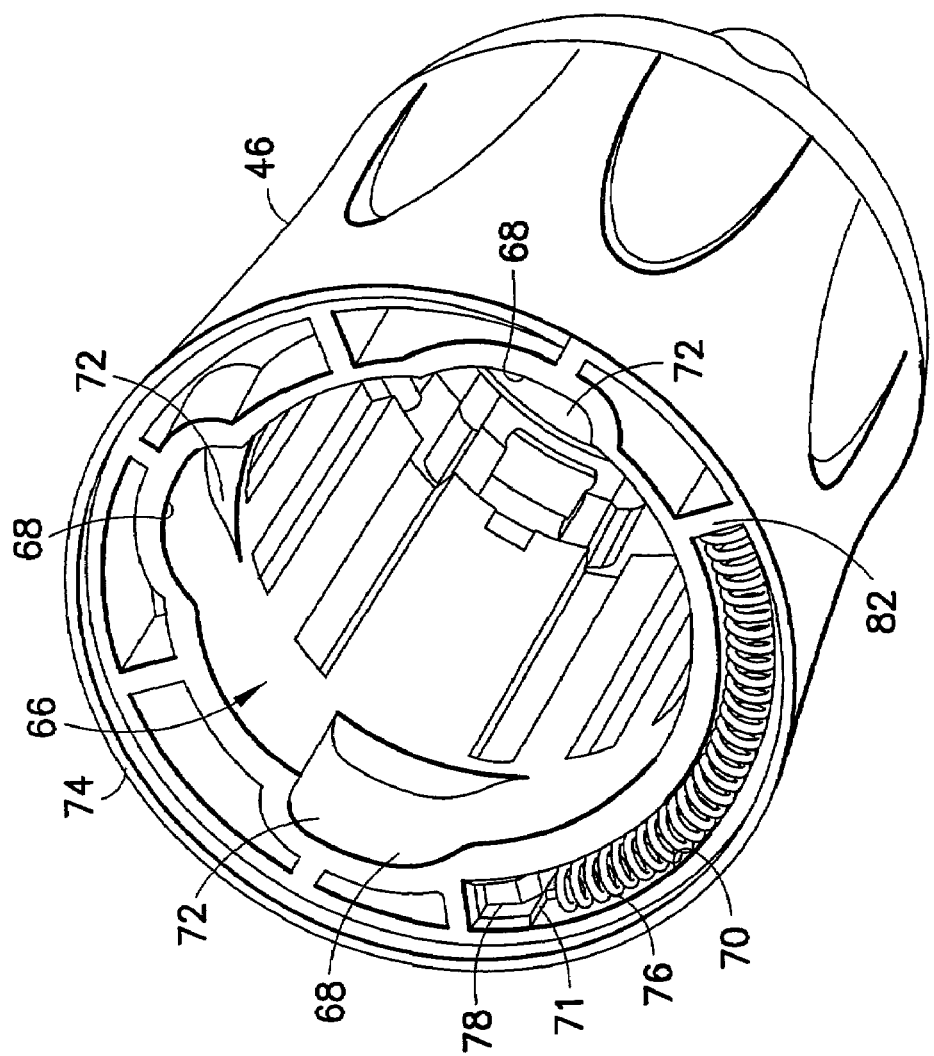
FIG. 5 is a rear perspective view of one section of the split-boom coupling system shown in FIGS. 2 and 4.

Referring also to FIGS. 4–6, the coupling system 18 generally comprises a first section 44, a collar or second section 46, and a tightening member 48. The first section 44 is fixedly connected to the front end 30 of the first boom member 14. The first section 44 generally comprises a rear portion 52, a middle portion 54, and a front section 56. The rear portion 52 comprises a general tubular shape. The front end 30 of the first boom member 14 extends into the center aperture of the rear portion 52. The front end 30 and the rear portion 52 are fixedly and stationarily connected to each other by fasteners, but any suitable fastening system could be used.

The middle portion 54 includes two cantilevered flanges 58, 59. The flanges 58, 59 have a home position wherein the flanges being spaced from each other. However, the flanges 58, 59 can be deflected towards each other by the tightening member 48 to reduce the cross sectional size of the main channel 45 (see FIG. 6) through the first section 44 at the middle portion 54. The tightening member 48 generally comprises a handle or knob 62, and a threaded bolt or shaft 64. The bolt 64 is stationarily attached to the far flange 58, and movably extends through the near flange 59.

The knob 62 is rotatably connected to the threads on the bolt 64 such that rotation of the knob relative to the bolt causes the knob to longitudinally move inward or outward in the bolt. The inner end of the knob rests against the near flange 59 such that the knob and bolt can deflect the flanges 58, 59 towards each other. The flanges 58, 59 can automatically return to their home, spaced positions when the knob 62 is moved outward on the bolt.

As noted above, the flanges 58, 59 can be deflected towards each other by the tightening member 48 to reduce the cross sectional size of the main channel through the first section 44 at the middle portion 54. Thus, the first section 44 can be tightened onto the frame 34 of the second boom member 16 to clamp the frame 34 to the first section 44 and, thus, stationarily attach the frame 34 to the frame 26 of the first boom member 14. However, this clamping feature can be unclamped by loosening the tightening member 48 to allow the first and second boom members to be decoupled. In an alternate embodiment, any suitable type of clamping system could be provided. Alternatively, the additional clamping system might not be provided.

As seen best in FIG. 6, the front section 56 of the first section 44 comprises a general tubular shape and extends in a forward direction from the middle portion 54 in a general cantilevered fashion. A bottom side of the front section 56 could comprise a slot therethrough along its length. The front section 56 has a main channel 57 therethrough which is sized and shaped to receive the rear end 32 of the second boom member 16. The front section 56 also comprises three apertures 60 therethrough. The apertures 60 are sized and shaped to allow the locating member 38 to project therethrough. The apertures 60 are preferably spaced about 90 degrees apart along the center axis of the main channel of the front section 56. However, in alternate embodiments, any suitable angle could be provided. The front section 56 preferably comprises three of the apertures 60. However, in alternate embodiments, more or less than three apertures could be provided.

The second section 46 is movably mounted to the first section 44 at the front section 56. In the embodiment shown, the second section 46 is rotatably mounted to the first section 44 for rotation about the same axis as the center channel of the first section 44 and the center axis of the second boom member 16 at the coupling. The second section 46 comprises a general ring or collar shape. However, in alternate embodiments, the second section 46 could comprise any suitable type of shape. In the embodiment shown, the coupling system 18 includes a front fastener 64 attached to the front end of the front section 56. The second section 46 is rotatably captured between the fastener 64 and the front of the middle portion 54. However, in alternate embodiments, any suitable system for movably attaching the second section to the first section could be provided.

Referring particularly to FIG. 5, the second section 46 comprises a center channel 66, cam surfaces 68, and a spring 70. The center channel 66 is sized and shaped to be rotatably mounted on the front section 56. The cam surfaces 68 are located in recessed areas 72 of the second section 46 facing inward towards the center channel 66. In the embodiment shown, the second section 46 comprises three of the recessed areas 72 and cam surfaces 68. However, in alternate embodiments, more or less than the three recessed areas and cam surfaces could be provided. The recessed areas 72 and cam surfaces 68 are spaced about 90 degrees apart from each other relative to the center axis of the center channel 66. However, in alternate embodiments, any suitable angle could be provided.

The spring 70 is located inside a pocket 76 in the second section 46 at the rear side 74. The pocket 76 includes an area 78 for receiving a projection 80 (see FIG. 4) extending from the front side of the middle portion 54 of the first section 44. One end 71 of the spring 70 is adapted to engage with the projection such that the spring 70 biases the second section 46 at a home position relative to the first section 44. However, a user can axially rotate the second section 46 relative to the first section 44 with the spring 70 being compressed between the projection 80 and the end 82 of the pocket 76. In alternate embodiments, any suitable type of biasing system could be provided. Alternatively, a biasing system might not be provided.

Figure 9:
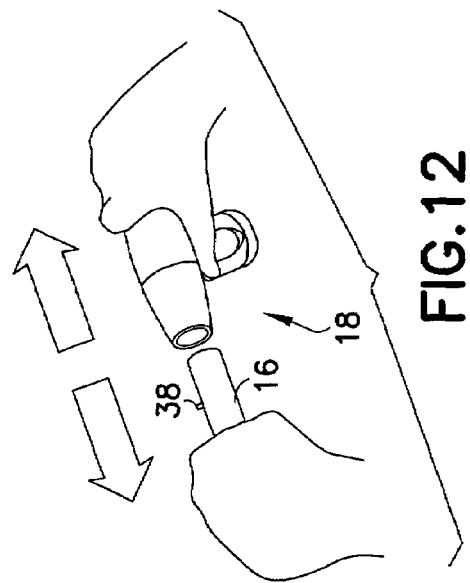
FIGS. 7–9 are diagrammatic views of a method of coupling two boom members together with the split-boom coupling system of the tool shown in FIGS. 1 and 2.
Figure 8:
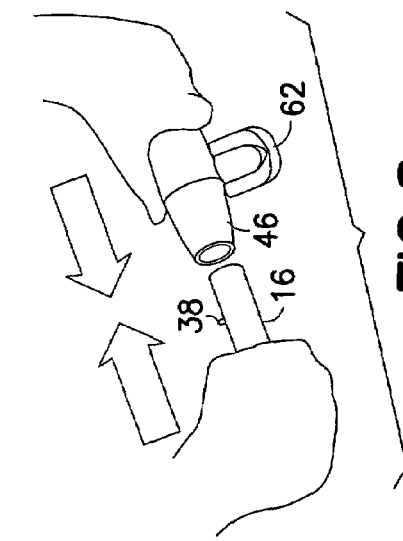
Figure 7:
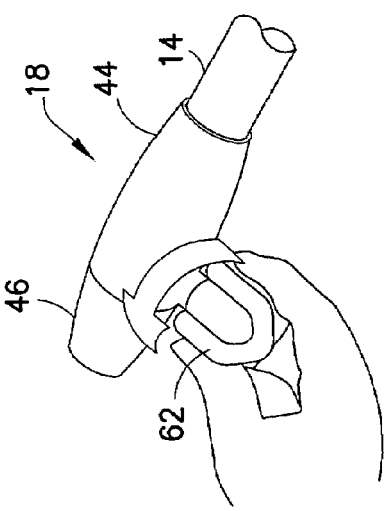

As shown in FIG. 6, when the second boom member 16 is attached to the coupling system 18, the locating member 38 can project through one of the apertures 60, into one of the recessed areas 72, and against one of the cam surfaces 68. Referring also to FIGS. 7–9, a method of attaching the second boom member 16 to the first boom member 14 by the coupling system 18 will be described. A user can first rotate the knob 62 to allow the two flanges 58, 59 to be located at their home spaced position relative to each other. The user can then insert the rear end of the second boom member 16 into the coupling system 18 as shown in FIG. 8. The front end of the fastener 64 or the second section 46 preferably comprises a lead-in caming surface 84 (see FIG. 4) to automatically cam the locating member 36 in an inward direction.

As the rear end 32 of the second boom member 16 is inserted, it extends into the center channel at the middle portion 54. The locating member 38 can extend into alignment with one of the apertures 60. The spring 40 can then deflect the locating member 38 through the aperture 60 and into the recessed area 72. This completes the initial locating of the second boom member 16 relative to the first boom member 14. As shown in FIG. 9, the user can then rotate the knob 62. This allows the flanges 58, 59 to be clamped towards each other resulting in the first section 44 being clamped onto the rear end 32 of the second boom member 16 to thereby fixedly attached the first and second boom members to each other.

Figure 12:
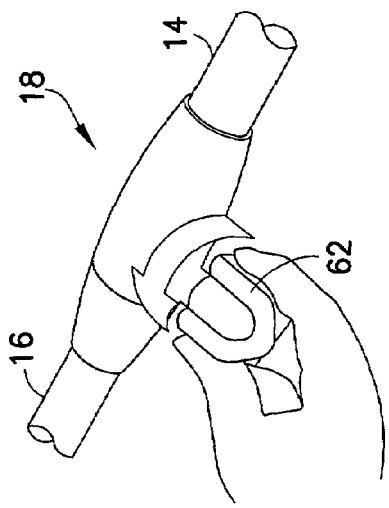
FIGS. 10–12 are diagrammatic views of a method of decoupling two boom members from each other with the split-boom coupling system of the tool shown in FIGS. 1 and 2.
Figure 11:
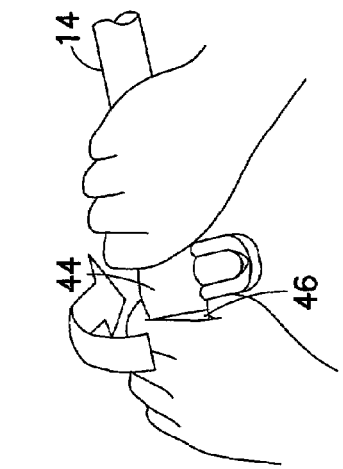
Figure 10:
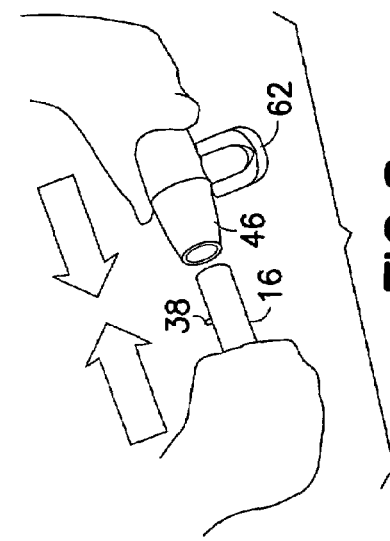

Referring now also to FIGS. 10–12, in order to decouple or disassemble the second boom member 16 from the first boom member 14, the user first rotates the knob 62 to loosen the clamping action provided by the flanges 58, 59. The user then rotates the second section 46 relative to the first section 44 as shown by FIG. 11. This causes one of the caming surfaces 68 in one of the recessed areas 72 of the second section 46 to depress the locating member 38 inward. The user then separates the second boom member 16 from the coupling system 18 by merely pulling the members apart as shown in FIG. 12. As noted above, the outer end of the locating member 38 is preferably curved to assist in moving the locating member 38 out of the aperture 60 as the second boom member 16 is pulled outward from the coupling system 18. The front end of the aperture 60 could also comprises a caming surface to assist in this decoupling process.

The coupling system described above is different from known prior art systems in that it eliminates the need to manually, directly depress the locating member on the lower boom for removal of the lower boom from the upper boom. The system described above merely requires a simple twisting action of the collar 46 which automatically depresses the locating member 38. Thus, the lower boom can be easily removed from the coupling without any difficulty. The relatively large surface area of the collar 46 allows easier grasping and manipulation of the decoupling system than provided with prior art systems. This may be particularly advantageous for users who do not comprise strong hands. In an alternate embodiment, the second section 46 might comprise any suitable movable member attached to the first section 44 which is adapted to depress the locating member 38 when moved from a home position.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A power tool coupling system for coupling two boom members of a split-boom power tool, the coupling system comprising:
    a first section adapted to be fixedly attached to an end of a first one of the boom members, the first section comprising an aperture for receiving a locating member on a second one of the boom members; and
    a second section movably connected to the first section over the aperture, wherein the second section is adapted to directly contact and depress the locating member, while the locating member is located in the aperture of the first section, when the second section is moved from a first to a second position to allow removal of the locating member from the aperture.

2. A power tool coupling system as in claim 1 wherein the second section is rotatably connected to the first section.

3. A power tool coupling system as in claim 2 wherein the second section comprises a cam surface facing an interior direction of the second section.

4. A power tool coupling system as in claim 3 wherein the second section comprises three of the cam surfaces facing the interior direction of the second section.

5. A power tool coupling system as in claim 3 wherein the cam surface forms a recessed pocket inside a center channel of the second section.

6. A power tool coupling system as in claim 1 wherein the second section comprises a general ring shape.

7. A power tool coupling system as in claim 1 wherein the second section is coaxially aligned with a boom receiving area of the first section.

8. A power tool coupling system as in claim 1 wherein the second section is spring loaded at a home position relative to the first section.

9. A power tool coupling system as in claim 1 further comprising a tightening member attached to two spaced flanges of the first section for clamping the first section and the boom member together.

10. A vegetation cutting tool comprising:
    a motor;
    a first boom member extending from the motor with a first rotatable shaft connected to the motor and extending through the first boom member;
    a second boom member connected to the first boom member by a power tool coupling system as in claim 1, the second boom member comprising a second rotatable shaft connected to the first rotatable shaft proximate the coupling system.

11. A power tool coupling system as in claim 1 wherein the first section has a first end adapted to be fixedly attached to the end of the first boom member, and the aperture is spaced from the first end for receiving the locating member on the second boom member.

12. A method of disconnecting two power tool boom members comprising the steps of:
    rotating a collar on a coupler from a first position to a second position; and
    depressing a locating member on a second one of the boom members by the collar as the collar is rotated from the first position to the second position, wherein the locating member is moved, at least partially, out of engagement with an aperture in the coupler by the collar by direct contact of the collar against the locating member above the aperture.

13. A method as in claim 12 wherein the collar is spring biased at a home position, and the step of rotating the collar moves the collar from the home position.

14. A method as in claim 12 wherein the step of depressing the locating member comprises caming the locating member in an inward direction by an inwardly facing cam surface on the collar.

* * * * *